(12) United States Patent
Inoue et al.

(10) Patent No.: US 7,601,770 B2
(45) Date of Patent: Oct. 13, 2009

(54) MULTI-FUNCTIONAL ADMIXTURES FOR CONCRETE

(75) Inventors: Kazumasa Inoue, Chiba (JP); Toshio Yonezawa, Chiba (JP); Kenrou Mitsui, Chiba (JP); Masarou Kojima, Chiba (JP); Mitsuo Kinoshita, Aichi (JP); Junji Inagaki, Aichi (JP); Shinji Tamaki, Aichi (JP); Toyoji Miura, Aichi (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 10/786,622

(22) Filed: Feb. 24, 2004

(65) Prior Publication Data

US 2005/0124737 A1 Jun. 9, 2005

(30) Foreign Application Priority Data

Mar. 3, 2003 (JP) .............................. 2003-055175

(51) Int. Cl.
*C04B 28/02* (2006.01)
*C04B 24/26* (2006.01)
*C04B 28/04* (2006.01)
*C04B 40/00* (2006.01)
*B29C 47/00* (2006.01)
*C08F 2/08* (2006.01)
*C07F 9/09* (2006.01)

(52) U.S. Cl. .................. 524/4; 524/5; 524/8; 524/388; 524/396; 524/127; 106/823

(58) Field of Classification Search ................. 524/4, 524/5, 8, 388, 396, 127; 106/109, 823
See application file for complete search history.

(56) References Cited

U.S. PATENT DOCUMENTS

| 3,287,145 | A | * | 11/1966 | Fischer ...................... 106/727 |
| 4,419,134 | A | * | 12/1983 | Ishijima et al. ............. 106/642 |
| 4,927,463 | A | * | 5/1990 | Kloetzer et al. ............. 106/779 |
| 5,571,319 | A | * | 11/1996 | Berke et al. ................. 106/802 |
| 5,604,273 | A | * | 2/1997 | Kerkar et al. .................. 524/4 |
| 5,660,626 | A | * | 8/1997 | Ohta et al. ................... 106/810 |
| 5,670,578 | A | * | 9/1997 | Shawl ........................ 525/187 |
| 6,034,208 | A | * | 3/2000 | McDaniel et al. ........... 528/403 |
| 6,409,824 | B1 | * | 6/2002 | Veeramasuneni et al. ... 106/772 |
| 6,486,260 | B1 | * | 11/2002 | Yuasa et al. ............... 525/327.7 |

FOREIGN PATENT DOCUMENTS

WO    WO 99/15475    *   4/1999

OTHER PUBLICATIONS

WO 99/15475, Derwent disclosure (Apr. 1, 1999).*

* cited by examiner

*Primary Examiner*—William K Cheung
(74) *Attorney, Agent, or Firm*—Weaver Austin Villeneuve & Smapson LLP

(57) ABSTRACT

A multi-functional admixture for concrete, having improved fluidity for providing hardened materials with improved early strength, smaller shrinkage rate, improved resistance against freezing and thawing action and slower carbonation speed, contains a specified kind of graft copolymer and/or its salt, a specified kind of (poly)alkyleneglycol monoalkyl ether and a specified kind of organic phosphate at specified ratios.

2 Claims, No Drawings

MULTI-FUNCTIONAL ADMIXTURES FOR CONCRETE

This application claims priority on Japanese patent application 2003-55175 filed Mar. 3, 2003.

BACKGROUND OF THE INVENTION

This invention relates to multi-functional admixtures for concrete. Recently, the following five functions are coming to be required in order to improve the quality of concrete: (1) It must have superior fluidity that does not deteriorate with time; (2) Hardened materials that are obtained must have a good early strength; (3) The shrinkage rate of hardened materials that are obtained must be low; (4) Hardened materials that are obtained must exhibit a strong resistance against freezing and thawing action; and (5) The carbonation speed of hardened materials that are obtained must be slow. This invention relates to multi-functional admixtures for concrete capable of simultaneously providing all these functions to concrete as well as concrete having all these functions simultaneously.

As shown in Japanese Patent Publications Tokkai 58-74552 and 63-285140 and U.S. Pat. No. 4,962,173, for example, various dispersants containing compounds of polycarboxylic acid have been known as an admixture for concrete capable of providing a superior fluidity that does not deteriorate with time. As shown in U.S. Pat. Nos. 4,547,223 and 5,181,961, on the other hand, various kinds of shrinkage reducing agents have been known as an admixture for concrete for reducing shrinkage of hardened materials obtained from concrete. Moreover, U.S. Pat. Nos. 5,660,626, 5,604,273 and 5,556,460 and Japanese Patent Publications Tokkai 2000-34151, 2001-10853 and 2001-48620, for example, have shown admixtures for concrete capable of not only providing concrete with a superior fluidity that does not deteriorate with time but also reducing the shrinkage of hardened materials obtained from concrete. The problem still remains with these prior art admixtures for concrete that, even if they are used singly or in combination, they cannot satisfy all of the required functions at the same time.

SUMMARY OF THE INVENTION

It is therefore an object of this invention to provide multi-functional admixtures for concrete capable of providing all of the required functions described above at the same time.

The invention is based on the discovery by the present inventors as a result of their investigations in view of the object described above that multi-functional admixtures for concrete comprised of three specified components at a specified ratio should be used and concrete having such an admixture added at a specified ratio with cement has all of these required functions.

DETAILED DESCRIPTION OF THE INVENTION

The invention relates to multi-functional admixtures for concrete characterized as containing Component A, Component B and Component C respectively by 15-94 weight %, 5-84 weight % and 0.1-5 weight % such that their total will be 100 weight % where Components A, B and C are defined as below.

Component A is one or more selected from the group consisting of graft copolymers obtained by a first process and a second process and salts of graft copolymers obtained further by a third process, where the first, second and processes are as defined below.

The first process is for obtaining copolymers with weight-average monocular weight of 5000-70000 by radical polymerization of a mixture of radical polymerizable monomers containing maleic anhydrides and monomers shown by Formula 1 which is given by:

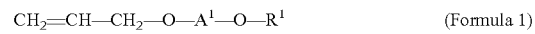

$$CH_2=CH-CH_2-O-A^1-O-R^1 \quad \text{(Formula 1)}$$

by a total of 95 molar % or more at molar ratio of 50/50-70/30.

The second process is for obtaining graft copolymers by graft reaction of 100, weight parts of the copolymers obtained in the first process with 0.05-5.0 weight parts of polyether compounds shown by Formula 2 which is given by:

$$R^2-O-A^2-OH \quad \text{(Formula 2)}$$

The third process is for obtaining salts of graft copolymers by partially or completely neutralizing the graft copolymers obtained in the second process with one or more selected from the group consisting of alkali metal hydroxides, alkali earth metal hydroxides and amines.

Symbols used in Formulas 1 and 2 are defined as follows:
$R^1$ is methyl group, acetyl group or hydrogen atom;
$R^2$ is aliphatic hydrocarbon group with 8-20 carbon atoms;
$A^1$ is residual group obtained by removing all hydroxyl groups from (poly)alkyleneglycol with (poly)oxyalkylene group having in molecule only 1-150 oxyethylene units or a total of 2-150 oxyethylene units and oxypropylene units;
$A^2$ is residual group obtained by removing all hydroxyl groups from (poly)alkyleneglycol with polyoxyalkylene group having in molecule a total of 23-70 oxyethylene units and oxypropylene units that are added in blocks.

Component B is (poly)alkyleneglycol monoalkyl ether shown by Formula 3 which is given by:

$$R^3-O-A^3-OH \quad \text{(Formula 3)}$$

where:
$R^3$ is alkyl group with 3-5 carbon atoms;
$A^3$ is residual group obtained by removing all hydroxyl groups from (poly)alkyleneglycol with (poly)oxyalkylene group having in molecule only 1-6 oxyethylene units or only 1-6 oxypropylene units, or a total of 2-8 oxyethylene units and oxypropylene units.

Component C is organic phosphate shown by Formula 4 which is given by:

$$\begin{array}{c} O \\ M^1O\diagdown \parallel \\ \phantom{M^1O}P-OR^4 \\ M^2O\diagup \end{array} \quad \text{(Formula 4)}$$

or Formula 5 which is given by:

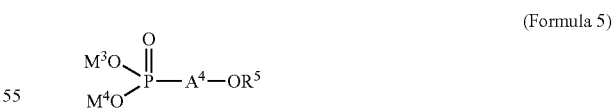

$$\begin{array}{c} O \\ M^3O\diagdown \parallel \\ \phantom{M^3O}P-A^4-OR^5 \\ M^4O\diagup \end{array} \quad \text{(Formula 5)}$$

where:
$R^4$ and $R^5$ are each alkyl group with 8-18 carbon atoms;
$A^4$ is (poly)oxypropylene group with 1-5 oxypropylene units;
$M^1$, $M^2$, $M^3$ and $M^4$ are each hydrogen atom, alkali metal, alkali earth metal, ammonium or organic amine.

This invention also relates to concrete characterized as being formed by adding 0.1-5 weight parts of a multi-functional admixture for concrete according to this invention to 100 weight parts of cement.

Multi-functional admixtures for concrete according to this invention (hereinafter simply referred to as the admixtures of this invention) are explained first. As explained above, the admixtures of this invention include Components A, B and C, and Component A is one or more selected from the group consisting of (1) graft copolymers obtained by the first and second processes and (2) salts of graft copolymers obtained further by the third process. Thus, Component A may be one or more of the graft copolymers of (1), one or more of the salts of (2), or a mixture thereof.

The first process is for obtaining copolymers by radical polymerization of a mixture of radical polymerizable monomers. As the mixture of radical polymerizable monomers, those containing maleic anhydrides and monomers shown by Formula 1 by a total of 95 molar % or more at molar ratio of 50/50-70/30, and preferably 55/45-65/35, are used. Regarding monomers shown by Formula 1, $R^1$ is methyl group, acetyl group or hydrogen atom but those with $R^1$ being methyl group or acetyl group are preferred.

Examples of $A^1$ in Formula 1 include (1) residual groups obtained by removing all hydroxyl groups from (poly)ethyleneglycol with (poly)oxyethylene group having in molecule only oxyethylene units and (2) residual groups obtained by removing all hydroxyl groups from (poly)ethylene (poly) propyleneglycol with (poly)oxyethylene (poly)oxypropylene group having in molecule both oxyethylene units and oxypropylene units, but those of (1) are preferred. In the case of (2), oxyethylene and oxypropylene units may be in random or block connection but those with random connection are preferred. The repetition number of oxyalkylene units such as oxyethylene units in $A^1$ may be 1-150 but the range of 10-90 is preferred.

Examples of the monomer shown by $A^1$ include (1) α-allyl-ω-acetyl-(poly)oxyethylene, (2) α-allyl-ω-acetyl-(poly)oxyethylene(poly)oxypropylene, (3) α-allyl-ω-methoxy-(poly)oxyethylene, (4) α-allyl-ω-methoxy-(poly)oxyethylene (poly)oxypropylene, (5) α-allyl-ω-hydroxy-(poly)oxyethylene, and (6) α-allyl-ω-hydroxy-(poly)oxyethylene (poly)oxypropylene.

The mixture of radical polymerizable monomers to be used in the first process are those containing maleic anhydride and monomers shown by Formula 1 by a total of 95 molar % or more. In other words, they may contain other kinds of radical polymerizable monomers by up to 5 molar %. Examples of such radical polymerizable monomer include styrene, vinyl acetate, acrylic acid, acrylates, alkyl acrylate, (meth)allyl sulfonic acid and (meth)allyl sulfonates.

The first process is for obtaining copolymers with weight-average molecular weight of 5000-70000, or preferably 10000-50000, by adding an initiator for radical polymerization of such a mixture of radical polymerizable monomers. Throughout herein, the "weight-average molecular weight" means the value Pullulan converted by GPC method. Examples of method for the radical polymerization include (1) methods without using any solvent and (2) methods of dissolving a mixture of radical polymerizable monomers in a solvent such as benzene, toluene, xylene, methylisobutyl ketone and dioxane, but methods of (1) are preferable. By a method of (1), for example, a mixture of radical polymerizable monomers is placed inside a reactor, an initiator is added thereto in a nitrogen atmosphere and a radical polymerization reaction is continued at 60°-90° C. for 5-10 hours. Either by a method of (1) not using any solvent or by a method of (2) using a solvent, the types of radical initiator and radical chain transfer agent and their amounts to be used, polymerization temperature and polymerization time should be appropriately selected in order to control the radical polymerization reaction to obtain a copolymer of a desired kind. Examples of radical initiator that may be used for the purpose of this invention include azo initiators such as azobisisobutylnitrile and 2,2'-azobis(4-methoxy2,4-dimethyl valeronitrile) and organic peroxide initiators such as benzoil peroxide, lauroyl peroxide and kumene hydroperoxide.

The second process is for obtaining graft copolymers by graft reaction of polyether compounds shown by Formula 2 to the copolymers obtained by the first process.

Regarding the polyether compounds shown by Formula 2, examples of $R^2$ in Formula 2 include (1) saturated aliphatic hydrocarbon groups with 8-20 carbon atoms such as octyl group, nonyl group, decyl group, undecyl group, dodecyl group, tridecyl group, tetradecyl group, pentadecyl group, hexadecyl group, octadecyl group, iso-octadecyl group and duodecyl group, and (2) unsaturated aliphatic hydrocarbon groups with 8-20 carbon atoms such as decenyl group, tetradecenyl group, octadecenyl group and eicocenyl group. Among the above, however, aliphatic hydrocarbon groups with 10-20 carbon atoms are preferred and unsaturated aliphatic hydrocarbon groups with 12-18 carbon atoms are even more preferred.

Regarding the polyether compounds shown by Formula 2, $A^2$ is residual group obtained by removing all hydroxyl groups from polyalkyleneglycol with polyoxyalkylene group having in molecule oxyethylene units and oxypropylene units that are added in blocks. The repetition number of the oxyethylene units and oxypropylene units comprising $A^2$ is 23-70, and more preferably 25-60. The polyether compounds shown by Formula 2 may be obtained by a known method by a block addition reaction of a total of 23-70 moles of ethylene oxide and propylene oxide with 1 mole of aliphatic alcohol with 8-20 carbon atoms.

In the second process, graft copolymers are obtained by graft reaction of 100 weight parts of the copolymers obtained in the first process with 0.05-5.0 weight parts, or preferably 0.2-4 weight parts, of polyether compounds shown by Formula 2 as explained above. Any known method may be used for such a graft reaction. For example, a copolymer obtained in the first process and a polyether compound shown in Formula 2 may be placed inside a reactor together with a basic catalyst and after the atmosphere is replaced with nitrogen, a graft reaction may be carried out at 100° C. for 4-6 hours to obtain graft copolymers. Examples of basic catalyst for this purpose may include those commonly known for the ring-opening esterification reaction between acid anhydride and alcohol but amine catalysts are desirable and lower alkylamines are even more desirable.

The third process is for obtaining salts of graft copolymers by partially or completely neutralizing the graft copolymers obtained in the second process by using a basic compound. Examples of basic compound to be used in the third process include (1) alkali metal hydroxides such as sodium hydroxide and potassium hydroxide, (2) alkali earth metal hydroxides such as calcium hydroxide and magnesium hydroxide, and (3) amines such as ammonia and triethanol amine. Among these examples, alkali metal hydroxides are preferred.

Component B to be used for the admixtures of this invention is (poly)alkyleneglycol monoalkyl ether shown by Formula 3. In Formula 3, $R^3$ indicates an alkyl group with 3-5 carbon atoms. Among examples of $R^3$, alkyl groups with 4 carbon atoms such as normal butyl group, isobutyl group, secondary butyl group and tertiary butyl group are preferable and tertiary butyl group is particularly preferable. Examples of (poly)alkyleneglycol monoalkyl ether shown by Formula 3 with one end closed by such $R^3$ include (1) (poly)ethyleneglycol monoalkyl ether with (poly)oxyethylene group having only 1-6 oxyethylene units in molecule, (2) polypropyleneglycol monoalkyl ether with (poly)oxypropylene group having only 1-6 oxypropylene units in molecule, and (3) polyalkyleneglycol monoalkyl ether with polyoxyalkylene group having a total of 2-8 oxyethylene units and oxypropylene units in molecule. In the examples of (3), it may be random or block combination of the oxyethylene and oxypropylene units but among these examples of (poly)alkyleneglycol monoalkyl ether, polypropyleneglycol monoalkyl ether with polyoxypropylene group having 2-4 oxypropylene units in molecule is preferred.

Component C to be used for the admixtures of this invention is an organic phosphate shown by Formula 4 or Formula 5. Organic phosphate shown by Formula 4 has alkyl group with 8-18 carbon atoms in its molecule. Examples of such organic phosphate shown by Formula 4 include monoalkyl phosphates where $M^1$ and $M^2$ in Formula 4 are hydrogen, alkali metal salts of such monoalkyl phosphates, alkali earth metal salts of such monoalkyl phosphates, ammonium salts of such monoalkyl phosphates and organic amine salts of such monoalkyl phosphates. Organic phosphate shown by Formula 5 has (poly)oxypropylene group having alkyl group with 8-18 carbon atoms and 1-5 oxypropylene units in its molecule. Examples of such organic phosphate shown by Formula 5 include monoalkyl(poly)oxypropylene phosphate where $M^3$ and $M^4$ in Formula 5 are hydrogen, alkali metal salts of such monoalkyl(poly)oxypropylene phosphate, alkali earth metal salts of such monoalkyl(poly)oxypropylene phosphates, ammonium salts of such monoalkyl(poly)oxypropylene phosphates and organic amine salts of such monoalkyl (poly)oxypropylene phosphates. Among these organic phosphates, those shown by Formula 5 where $R^5$ is alkyl group with 10-16 carbon atoms and $M^3$ and $M^4$ are each alkali metal are preferred, and those shown by Formula 5 where $A^4$ is (poly)oxypropylene group having 1-5 oxypropylene units are particularly preferred.

Organic phosphates shown by Formula 4 can be synthesized by a known method. Monoalkyl phosphate where $M^1$ and $M^2$ of Formula 4 are hydrogen may be synthesized, for example, by causing phosphoric anhydride to react with higher alcohol with 8-18 carbon atoms and thereafter using an organic solvent to cause recrystallization and its alkali metal salt may be obtained by neutralizing it with alkali hydroxide. Organic phosphates shown by Formula 5 can be synthesized by using (poly)oxypropylene monoalkyl ether in the above instead of higher alcohol.

Admixtures according to this invention are characterized as comprising Components A, B and C as described above, containing Component A by 15-94 weight %, or preferably by 20-84 weight %, Component B by 5-84 weight %, or preferably by 15-79 weight % and Component C by 0.1-5 weight %, or preferably 0.3-3 weight %, such that their total will be 100 weight %.

Next, concrete embodying this invention (hereinafter referred to as concrete according to this invention) is explained. Concrete according to this invention contains the basic components of concrete which are cement, fine aggregates, coarse aggregates and water, and further 0.1-5 weight parts, or preferably 0.15-3.5 weight parts, of an admixture of this invention against 100 weight parts of the cement.

Examples of type of cement to be used for producing concrete according to this invention include different kinds of portland cement such as normal portland cement, high early strength portland cement and moderate heat portland cement, as well as many different kinds of blended cement such as blast-furnace slag cement, fly ash cement and silica fume cement. Examples of fine aggregates include river sand, mountain sand, beach sand and crushed sand. Examples of coarse aggregates include river gravels, crushed stones and light-weight aggregates.

It is recommended to add an admixture of this invention to concrete such that the entrained air content due to the mixing becomes 3-6 volume % such that hardened materials obtained by hardening it exhibit a strong resistance against freezing and thawing action. With admixtures of this invention, it is easy to adjust the entrained air content. Since Component C affects the entrained air content most significantly, an admixture of this invention containing Component C by 0.3-3 weight % may be produced and if 0.15-3.5 weight parts of such an admixture are added to 100 weight parts of cement, the entrained air content can be easily adjusted to 3-6 volume %. Concrete with its entrained air content thus adjusted is so-called AE concrete.

When preparing concrete embodying this invention, additives of other kinds such as a hardening accelerator, a hardening retarder, a water-proofing agent, an antiseptic and a steel corrosion inhibitor may be additionally added to the extent that the effects of this invention are not adversely affected.

The invention is described next in terms of some practical examples.

(1) Admixture containing Components A, B and C respectively by 50 weight %, 49 weight % and 1 weight % (such that the total is 100 weight %) wherein:

Component A is graft copolymer (a-1) obtained by the following first process and second process;

First process is for obtaining copolymer with weight-average molecular weight of 28000 by radical polymerization of a mixture of radical polymerizable monomers containing maleic anhydride and α-allyl-ω-methyl-polyoxyethylene (repetition number of oxyethylene units (=n)=33) for a total of 100 molar % and at molar ratio of 60/40;

Second process is for obtaining graft copolymer (a-1) by a graft reaction of 100 weight parts of copolymer obtained by the first process and 3 weight parts of α-oleyl-ω-hydroxy-polyoxyethylene (n=6) polyoxypropylene (repetition number of oxypropylene units (=m)=43);

Component B is dipropyleneglycol mono-tertiary-butyl ether;

Component C is sodium salt of monodecyl oxypropylene phosphate.

(2) Admixture containing Components A, B and C respectively by 50 weight %, 49 weight % and 1 weight % (such that the total is 100 weight %) wherein:

Component A is graft copolymer (a-2) obtained by the following first process and second process;

First process is for obtaining copolymer with weight-average molecular weight of 42300 by radical polymerization of a mixture of radical polymerizable monomers containing maleic anhydride and α-allyl-ω-methyl-polyoxyethylene (n=70) for a total of 100 molar % and at molar ratio of 60/40;

Second process is for obtaining graft copolymer (a-2) by a graft reaction of 100 weight parts of copolymer obtained by the first process and 1.5 weight parts of α-lauryl-ω-hydroxy-polyoxyethylene (n=3) polyoxypropylene (m=32);

Component B is dipropyleneglycol mono-tertiary-butyl ether;

Component C is sodium salt of monodecyl oxypropylene phosphate.

(3) Admixture containing Components A, B and C respectively by 50 weight %, 49 weight % and 1 weight % (such that the total is 100 weight %) wherein:

Component A is graft copolymer (a-3) obtained by the following first process and second process;

First process is for obtaining copolymer with weight-average molecular weight of 15000 by radical polymerization of a mixture of radical polymerizable monomers containing maleic anhydride and α-allyl-ω-acetyl-polyoxyethylene (n=10) for a total of 100 molar % and at molar ratio of 60/40;

Second process is for obtaining graft copolymer (a-3) by a graft reaction of 100 weight parts of copolymer obtained by the first process and 0.3 weight parts of α-oleyl-ω-hydroxy-polyoxyethylene (n=6) polyoxypropylene (m=43);

Component B is dipropyleneglycol mono-tertiary-butyl ether;

Component C is sodium salt of monodecyl oxypropylene phosphate.

(4) Admixture containing Components A, B and C respectively by 50 weight %, 49 weight % and 1 weight % (such that the total is 100 weight %) wherein:

Component A is graft copolymer (a-4) obtained by the following first process and second process;

First process is for obtaining copolymer with weight-average molecular weight of 33400 by radical polymerization of a mixture of radical polymerizable monomers containing maleic anhydride and α-allyl-ω-acetyl-polyoxyethylene (n=50) for a total of 100 molar % and at molar ratio of 60/40;

Second process is for obtaining graft copolymer (a-4) by a graft reaction of 100 weight parts of copolymer obtained by the first process and 0.8 weight parts of α-oleyl-ω-hydroxy-polyoxyethylene (n=6) polyoxypropylene (m=43);

Component B is dipropyleneglycol mono-tertiary-butyl ether;

Component C is sodium salt of monodecyl oxypropylene phosphate.

(5) Admixture containing Components A, B and C respectively by 50 weight %, 49 weight % and 1 weight % (such that the total is 100 weight %) wherein:

Component A is graft copolymer (a-5) obtained by the following first process and second process;

First process is for obtaining copolymer with weight-average molecular weight of 47500 by radical polymerization of a mixture of radical polymerizable monomers containing maleic anhydride, α-allyl-ω-hydroxy-polyoxyethylene (n=80) polyoxypropylene (m=10) and styrene for a total of 100 molar % and at molar ratio of 58/40/2;

Second process is for obtaining graft copolymer (a-5) by a graft reaction of 100 weight parts of copolymer obtained by the first process and 4 weight parts of α-lauryl-ω-hydroxy-polyoxyethylene (n=3) polyoxypropylene (m=32);

Component B is dipropyleneglycol mono-tertiary-butyl ether;

Component C is sodium salt of monodecyl oxypropylene phosphate.

(6) Admixture containing Components A, B and C respectively by 50 weight %, 49 weight % and 1 weight % (such that the total is 100 weight %) wherein:

Component A is salt (a-6) of graft copolymer obtained by the following third process on aforementioned graft copolymer (a-1);

Third process is for obtaining salt (a-6) of graft copolymer by partially neutralizing graft copolymer (a-1) with sodium hydroxide;

Component B is dipropyleneglycol mono-tertiary-butyl ether;

Component C is sodium salt of monodecyl oxypropylene phosphate.

(7) Admixture containing Components A, B and C respectively by 50 weight %, 49 weight % and 1 weight % (such that the total is 100 weight %) wherein:

Component A is salt (a-7) of graft copolymer obtained by the following third process on aforementioned graft copolymer (a-3);

Third process is for obtaining salt (a-7) of graft copolymer by completely neutralizing graft copolymer (a-3) with sodium hydroxide;

Component B is dipropyleneglycol mono-tertiary-butyl ether;

Component C is sodium salt of monodecyl oxypropylene phosphate.

(8) Admixture containing Components A, B and C respectively by 50 weight %, 49 weight % and 1 weight % (such that the total is 100 weight %) wherein:

Component A is salt (a-8) of graft copolymer obtained by the following third process on aforementioned graft copolymer (a-5);

Third process is for obtaining salt (a-8) of graft copolymer by partially neutralizing graft copolymer (a-5) with sodium hydroxide;

Component B is dipropyleneglycol mono-tertiary-butyl ether;

Component C is sodium salt of monodecyl oxypropylene phosphate.

(9) Admixture containing Components A, B and C respectively by 50 weight %, 48.7 weight % and 1.3 weight % (such that the total is 100 weight %) wherein:

Component A is aforementioned graft copolymer (a-1);

Component B is dipropyleneglycol monoisobutylether;

Component C is potassium salt of monodecyl polyoxypropylene phosphate with polyoxypropylene group having three oxypropylene units in molecule.

(10) Admixture containing Components A, B and C respectively by 25 weight %, 72.8 weight % and 2.2 weight % (such that the total is 100 weight %) wherein:

Component A is aforementioned graft copolymer (a-2);

Component B is tetrapropyleneglycol monoisopropylether;

Component C is potassium salt of monodecyl polyoxypropylene phosphate with polyoxypropylene group having three oxypropylene units in molecule.

(11) Admixture containing Components A, B and C respectively by 25 weight %, 74 weight % and 1 weight % (such that the total is 100 weight %) wherein:

Component A is aforementioned graft copolymer (a-3);

Component B is diethyleneglycol mono-normal-butyl ether;

Component C is potassium salt of monodecyl polyoxypropylene phosphate with polyoxypropylene group having three oxypropylene units in molecule.

(12) Admixture containing Components A, B and C respectively by 75 weight %, 23 weight % and 2 weight % (such that the total is 100 weight %) wherein:

Component A is aforementioned graft copolymer (a-4);

Component B is isoamyl ether with oxyalkylene group having one oxypropylene unit and one oxyethylene unit in molecule;

Component C is sodium salt of monotetradecyl phosphate.

(13) Admixture containing Components A, B and C respectively by 75 weight %, 22.8 weight % and 2.2 weight % (such that the total is 100 weight %) wherein:

Component A is aforementioned graft copolymer (a-5);

Component B is polyalkyleneglycol mono-normal-butyl ether with polyoxyalkylene group having two oxypropylene units and two oxyethylene units in molecule;

Component C is sodium salt of monotetradecyl phosphate.

(14) Admixture containing Components A, B and C respectively by 75 weight %, 23.7 weight % and 1.3 weight % (such that the total is 100 weight %) wherein:

Component A is aforementioned graft copolymer (a-1);

Component B is dipropyleneglycol mono-tertiary-butyl ether;

Component C is sodium salt of oxypropylene decylether monoalkyl phosphate.

(15) Admixture containing Components A, B and C respectively by 25 weight %, 74.5 weight % and 0.5 weight % (such that the total is 100 weight %) wherein:

Component A is aforementioned graft copolymer (a-1);

Component B is dipropyleneglycol mono-tertiary-butyl ether;

Component C is sodium salt of monodecyl oxypropylene phosphate.

Concrete embodying this invention is described next in terms of the following practical example.

(16) Concrete produced by preparing a mixture of cement, fine aggregates and coarse aggregates, adding 0.15-3.5 weight parts of one of the fifteen admixtures (1)-(15) described above for 100 weight parts of cement and kneading them together with water such that the entrained air content becomes 3-6 volume %.

In what follows, some test examples are shown in order to further explain the invention and its effects but these examples are not intended to limit the scope of the invention. In what follows, % means weight % and parts mean weight parts, unless explained to be otherwise.

TEST EXAMPLES

Part 1 (Synthesis of Graft Copolymers of Component A, etc.)

Synthesis of Graft Copolymer (a-1)

Maleic anhydride 157 g (1.6 moles) and α-allyl-ω-methyl-polyoxyethylene (n=33) 1524 g (1.0 mole) were placed inside a reactor and after they were dissolved uniformly with stirring, the atmosphere was replaced with nitrogen. While the reacting system was maintained at 70° C. with a hot water bath, azobisisobutylonitrile 3 g was added to start a radical polymerization reaction. Azobisisobutylonitrile 5 g was further added in divided portions and the radical polymerization reaction was concluded after it was continued for 4 hours. The copolymer thus obtained was analyzed and found to be a copolymer with weight-average molecular weight of 28000 having maleic anhydride and α-allyl-ω-methyl-polyoxyethylene (n=33) at molar ratio of 60/40 (converted to raw materials). Next, this copolymer 100 g and α-oleyl-ω-hydroxy-polyoxyethylene (n=6) polyoxypropylene (m=43) 3 g having 6 moles of ethylene oxide and 43 moles of propylene oxide added in blocks per 1 mole of oleyl alcohol were placed inside a reactor together with tributylamine 2 g as catalyst and the atmosphere was replaced with nitrogen. The reacting system was maintained at 90° C. with stirring to continue a graft reaction for 4 hours to obtain graft copolymer (a-1).

Synthesis of Graft Copolymers (a-2)-(a-4) and (r-1)-(r-5)

Graft copolymers (a-2)-(a-4) and (r-1)-(r-5) were synthesized as described above for the synthesis of graft copolymer (a-1).

Synthesis of Salt (a-6) of Graft Copolymer

A 40% aqueous solution 250 g of aforementioned graft copolymer (a-1) was placed inside a reactor and a 30% aqueous solution of sodium hydroxide 14 g was gradually added with stirring to carry out partial neutralization and to thereby obtain partially neutralized salt (a-6) of graft copolymer. Its degree of neutralization was 60%.

Synthesis of Salt (a-7) of Graft Copolymer

A 40% aqueous solution 250 g of aforementioned graft copolymer (a-3) was placed inside a reactor and a 30% aqueous solution of sodium hydroxide 56 g was gradually added with stirring to carry out complete neutralization and to thereby obtain completely neutralized salt (a-7) of graft copolymer.

Details of the graft copolymers and their salts thus obtained are summarized in Table 1.

TABLE 1

| | First process | | | | | Second process | |
|---|---|---|---|---|---|---|---|
| | Molar % of monomers | | | | | | |
| Kind of graft copolymer and salt | Maleic anhydride (molar %) (1) | Monomer of Formula 1 (kind/molar %) (2) | Other monomers (kind/molar %) | Molar ratio (1)/(2) | WAMW | Polyether compound of Formula 2 (kind/*1) | Third Process Kind of basic compound for neutralization |
| a-1 | 60 | d-1/40 | | 60/40 | 28000 | f-1/3.0 | |
| a-2 | 60 | d-2/40 | | 60/40 | 42300 | f-2/1.5 | |
| a-3 | 60 | d-3/40 | | 60/40 | 15000 | f-1/0.3 | |
| a-4 | 60 | d-4/40 | | 60/40 | 33400 | f-1/0.8 | |
| a-6 | 60 | d-1/40 | | 60/40 | 28000 | f-1/3.0 | *2 |
| a-7 | 60 | d-3/40 | | 60/40 | 15000 | f-1/0.3 | *2 |
| r-1 | 60 | d-1/40 | | 60/40 | 15000 | f-1/0.01 | |
| r-2 | 60 | d-1/40 | | 60/40 | 15000 | f-1/10 | |
| r-3 | 60 | d-3/40 | | 60/40 | 28000 | fr-1/3.0 | |
| r-4 | 50 | d-4/40 | e-1/10 | 55/45 | 31000 | fr-2/3.0 | |
| r-5 | 60 | dr-1/40 | | 60/40 | 82000 | f-2/2.5 | |

In Table 1:
WAMW: Weight-average molecular weight
*1: Weight part of polyether compound shown by Formula 2 used for graft reaction with 100 parts of copolymer obtained in the first process;
*2: Sodium hydroxide;
d-1: α-allyl-ω-methyl-polyoxyethylene (n = 33);
d-2: α-allyl-ω-methyl-polyoxyethylene (n = 70);
d-3: α-allyl-ω-acetyl-polyoxyethylene (n = 10);
d-4: α-allyl-ω-acetyl-polyoxyethylene (n = 50);
e-1: Styrene;
f-1: α-oleyl-ω-hydroxy-polyoxyethylene (n = 6) polyoxypropylene (m = 43);
f-2: α-lauryl-ω-hydroxy-polyoxyethylene (n = 3) polyoxypropylene (m = 32);
dr-1: α-allyl-ω-acetyl-polyoxyethylene (n = 160);
fr-1: α-lauryl-ω-hydroxy-polyoxyethylene (n = 15);
fr-2: α-oleyl-ω-hydroxy-polyoxyethylene (n = 50).

Part 2 (Preparation of Admixtures)

Test Example 1

Admixture (P-1) was prepared by mixing 50 parts of graft copolymer (a-1) synthesized in Part 1 as Component A, 49 parts of dipropyleneglycol mono-tertiary-butyl ether as Component B and 1 part of sodium salt of monodecyl oxypropylene phosphate as Component C.

Test Examples 2-4, 6, 7, 9-11, 14 and 15 and Comparison Examples 1-13

Admixtures (P-2)-(P-4), (P-6), (P-7), (P-9)-(P-11), (P-14) and (P-15) as Test Examples 2-4, 6, 7, 9-11, 14 and 15 and admixtures (R-1)-(R-13) as Comparison Examples 1-13 were prepared as described above for the preparation of admixture (R-1) as Test Example 1.

Details of the admixtures prepared in these examples are summarized in Table 2.

TABLE 2

| | Kind | Component A (kind/ ratio(part)) | Component B (kind/ ratio(part)) | Component C (kind/ ratio(part)) | Others (kind/ ratio(part)) |
|---|---|---|---|---|---|
| Test Example: | | | | | |
| 1 | P-1 | a-1/50 | b-1/49 | c-1/1 | |
| 2 | P-2 | a-2/50 | b-1/49 | c-1/1 | |
| 3 | P-3 | a-3/50 | b-1/49 | c-1/1 | |
| 4 | P-4 | a-4/50 | b-1/49 | c-1/1 | |
| 6 | P-6 | a-6/50 | b-1/49 | c-1/1 | |
| 7 | P-7 | a-7/50 | b-1/49 | c-1/1 | |
| 9 | P-9 | a-1/50 | b-2/48.7 | c-2/1.3 | |
| 10 | P-10 | a-2/25 | b-3/72.8 | c-2/2.2 | |
| 11 | P-11 | a-3/25 | b-4/74 | c-2/1 | |
| 14 | P-14 | a-1/75 | b-1/23.7 | c-1/1.3 | |
| 15 | P-15 | a-1/25 | b-1/74.5 | c-1/0.5 | |
| Comparison Example: | | | | | |
| 1 | R-1 | | b-1/49.9 | c-1/0.1 | r-1/50 |
| 2 | R-2 | | b-2/47 | c-1/3 | r-2/50 |
| 3 | R-3 | | b-2/49.8 | c-2/0.2 | r-3/50 |
| 4 | R-4 | | b-3/49.8 | c-2/0.2 | r-4/50 |
| 5 | R-5 | | b-3/49.5 | c-3/0.5 | r-5/50 |
| 6 | R-6 | a-1/97 | b-1/2 | c-1/1 | |
| 7 | R-7 | a-1/10 | b-1/89.5 | c-1/0.5 | |
| 8 | R-8 | a-1/5 | b-2/94.2 | c-2/0.8 | |
| 9 | R-9 | a-1/50 | b-1/49.5 | | *3/0.5 |
| 10 | R-10 | a-1/50 | b-2/43 | c-1/7 | |
| 11 | R-11 | | | c-1/1 | *4/99 |
| 12 | R-12 | | b-2/49.7 | c-2/0.3 | *4/50 |
| 13 | R-13 | | | c-1/1.5 | *5/98.5 |

In Table 2:
a-1-a-8 and r-1-r-5: Graft polymers and their salts synthesized in Part 1;
b-1: Dipropyleneglycol mono-tertiary-butyl ether;
b-2: Dipropyleneglycol monoisobutyl ether;
b-3: Tetrapropyleneglycol monoisopropyl ether;
b-4: Diethyleneglycol mono-normal-butyl ether;
c-1: Sodium salt of monodecyl oxypropylene phosphate;
c-2: Potassium salt of monodecyl polyoxypropylene phosphate with polyoxypropylene group having three oxypropylene units in molecule;
c-3: Sodium salt of monotetradecyl phosphate;
*3: Rosin salt air entraining agent (Trade name AE300 produced by Takemoto Yushi Kabushiki Kaisha);
*4: Polycarboxylic acid cement dispersant (Trade name Chupol produced by Takemoto Yushi Kabushiki Kaisha);
*5: Naphthalene sulfonate cement dispersant (Trade name Polefine produced by Takemoto Yushi Kabushiki Kaisha).

Part 3 (Preparation and Evaluation of Concrete)

Test Examples 16-30 and Comparison Examples 14-26

Concrete samples were prepared as follows under the conditions shown in Table 3. Normal portland cement (specific weight=3.16; braine value=3300), fine aggregates (Ooi-gawa River sand with specific weight=2.58) and coarse aggregates (crushed stones from Okazaki with specific weight=2.68) were sequentially added into a forced-mixing pan-type mixer with capacity 50 liters and subjected to a free kneading process for 15 seconds. Next, admixtures prepared in Part 1 were each added with water and kneaded such that the target slump would be within the range of 18±1 cm and the target air content would be within the range of 4-5%. Table 4 shows the amount of each admixture that was added.

TABLE 3

| Water/ cement ratio (%) | Ratio of fine aggregates (%) | Unit amount (kg/m$^3$) | | | |
|---|---|---|---|---|---|
| | | Water | Cement | Fine aggregates | Coarse aggregates |
| 47.1 | 47.0 | 164 | 348 | 826 | 967 |

Evaluation of Concrete

For each of the concrete samples, air quantity, slump and slump loss were evaluated as follows. The results of evaluation are shown in Table 4.

For hardened materials obtained from each concrete sample, shrinkage rate, durability index against freezing and thawing action, accelerated carbonation depth and compressive strength were evaluated as follows. The results are shown in Table 5.

Air quantity: Measured according to JIS-A1128 both just after concrete has been mixed with kneading and after the mixed concrete has been left quietly for 90 minutes.

Slump: Measured according to JIS-A1101 at the same time as air quantity was measured.

Slump loss: Calculated as the percentage of slump after 90 minutes with respect to the slump immediately after the kneading.

Shrinkage ratio: Measured according to JIS-A1129 by a comparator method on each concrete sample after keeping it for 26 weeks under a controlled condition of temperature 20° C. and humidity of 60% RH.

Durability index against freezing and thawing action: Measured according to Appendix 2 of JIS-A1129 and calculated with durability index according to ASTM-C666-75. The maximum value of this index is 100. The closer the index is to 100, the stronger is the resistance against freezing and thawing action.

Compressive strength: Measured according to JIS-A1108 at ages 7 days and 28 days.

Accelerated carbonation depth: Acceleration tests were carried out by sealing with epoxy resin the placing side, bottom surface and both side surfaces of each concrete sample in a columnar shape of 10×10×40 cm under the condition of relative humidity 60%, temperature 20° C. and concentration of carbon dioxide 5% and cutting the sample at age 13 weeks and blowing on 1% phenolphthalein solution. The part which did not turn red was considered neutralized part and the distance from the exterior was defined as the accelerated carbonation depth. The smaller this value, the less is the advancement of neutralization and hence the stronger the durability

TABLE 4

| | Admixture | | Property of concrete | | | | |
| --- | --- | --- | --- | --- | --- | --- | --- |
| | | | Immediately after kneading | | 90 minutes later | | |
| | Kind | Added amount *6 | Slump (cm) | Air quantity (%) | Slump (cm) | Air quantity (%) | Slump loss (%) |
| Test Example: | | | | | | | |
| 16 | P-1 | 0.34 | 18.6 | 4.7 | 15.9 | 4.6 | 85.5 |
| 17 | P-2 | 0.46 | 18.3 | 4.5 | 17.0 | 4.7 | 92.9 |
| 18 | P-3 | 0.40 | 18.3 | 4.4 | 15.1 | 4.3 | 80.3 |
| 19 | P-4 | 0.42 | 18.5 | 4.7 | 17.3 | 4.4 | 93.5 |
| 21 | P-6 | 0.35 | 18.5 | 4.8 | 16.0 | 4.5 | 86.5 |
| 22 | P-7 | 0.41 | 18.6 | 4.5 | 15.2 | 4.3 | 81.7 |
| 24 | P-9 | 0.35 | 18.4 | 4.5 | 16.0 | 4.7 | 87.0 |
| 25 | P-10 | 0.92 | 18.6 | 4.8 | 16.8 | 4.3 | 90.3 |
| 26 | P-11 | 0.80 | 18.5 | 4.6 | 15.2 | 4.4 | 82.2 |
| 29 | P-14 | 0.23 | 18.5 | 4.5 | 15.7 | 4.2 | 84.9 |
| 30 | P-15 | 0.70 | 18.8 | 4.7 | 16.0 | 4.5 | 85.1 |
| Comparison Example: | | | | | | | |
| 14 | R-1 | 0.32 | 18.4 | 4.6 | 14.0 | 4.2 | 76.1 |
| 15 | R-2 | 0.38 | 18.6 | 4.4 | 12.0 | 4.0 | 64.5 |
| 16 | R-3 | 0.44 | 18.5 | 4.5 | 13.5 | 4.4 | 73.0 |
| 17 | R-4 | 0.46 | 18.7 | 4.7 | 14.5 | 4.5 | 77.5 |
| 18 | R-5 | 0.71 | 18.1 | 4.5 | 8.5 | 4.1 | 47.0 |
| 19 | R-6 | 0.18 | 18.2 | 4.4 | 14.5 | 4.2 | 79.7 |
| 20 | R-7 | 1.70 | 18.4 | 4.7 | 13.3 | 4.1 | 72.3 |
| 21 | R-8 | 3.40 | 18.2 | 4.8 | 11.5 | 4.3 | 63.2 |
| 22 | R-9 | 0.34 | 18.5 | 4.8 | 14.9 | 4.1 | 81.4 |
| 23 | R-10 | 0.30 | 18.9 | 8.9 | 13.0 | 6.5 | 68.8 |
| 24 | R-11 | 0.20 | 18.7 | 4.4 | 14.8 | 4.2 | 79.1 |
| 25 | R-12 | 0.40 | 18.5 | 4.5 | 14.6 | 4.1 | 78.9 |
| 26 | R-13 | 0.52 | 18.2 | 4.8 | 7.9 | 4.2 | 43.4 |

In Table 4:
*6: Part of added admixture against 100 parts of cement.

TABLE 5

| | Properties of admixture | | | | |
| --- | --- | --- | --- | --- | --- |
| | Shrinkage ($\times 10^{-4}$) | Durability against freezing and thawing | Accelerated | Compressive strength | |
| | at 26 weeks | action (300 cycles) | carbonation depth (mm) | Age = 7 days | Age = 28 days |
| Test Example: | | | | | |
| 16 | 5.2 | 96 | 10.8 | 36.3 | 49.2 |
| 17 | 5.3 | 98 | 10.8 | 36.5 | 49.4 |
| 18 | 5.1 | 92 | 10.7 | 35.1 | 48.0 |
| 19 | 5.2 | 95 | 10.8 | 36.5 | 49.0 |
| 21 | 5.2 | 96 | 10.8 | 36.4 | 49.2 |
| 22 | 5.1 | 95 | 10.7 | 35.3 | 48.2 |
| 24 | 5.3 | 94 | 10.8 | 36.8 | 50.3 |
| 25 | 4.8 | 91 | 10.6 | 35.2 | 48.4 |
| 26 | 4.9 | 92 | 10.7 | 35.0 | 48.1 |
| 29 | 5.5 | 97 | 10.9 | 36.6 | 49.6 |
| 30 | 4.9 | 95 | 10.9 | 35.4 | 48.5 |
| Comparison Example: | | | | | |
| 14 | 5.4 | 52 | 12.1 | 34.1 | 47.5 |
| 15 | 5.5 | 55 | 12.3 | 34.3 | 47.7 |
| 16 | 5.4 | 48 | 12.1 | 33.6 | 47.0 |
| 17 | 5.9 | 35 | 12.6 | 33.9 | 47.2 |
| 18 | 6.0 | 46 | 12.4 | 34.3 | 47.8 |
| 19 | 7.1 | 94 | 14.0 | 36.2 | 49.0 |
| 20 | 6.2 | 65 | 10.8 | 33.5 | 45.2 |
| 21 | 6.5 | 60 | 10.7 | 32.0 | 42.9 |
| 22 | 5.3 | Less than 30 | 10.9 | 36.0 | 49.1 |
| 23 | *7 | *7 | *7 | 29.4 | 40.2 |
| 24 | 7.5 | 88 | 14.2 | 36.2 | 49.0 |
| 25 | 7.0 | Less than 30 | 12.8 | 34.5 | 48.0 |
| 26 | 7.7 | 91 | 14.5 | 34.9 | 48.3 |

In Table 5:
*7: Not measured because the air quantity was too large.

As can be understood from the above, the present invention has the effect of simultaneously providing concrete with superior fluidity that does not deteriorate with time and capable of producing hardened materials that have a good early strength, a low shrinkage rate, a strong resistance against freezing and thawing action, and a low carbonation speed.

What is claimed is:

1. A multi-functional admixture for concrete, said multi-functional admixture comprising Component A by 20-84 weight %, Component B by 15-79 weight % and Component C by 0.3-3 weight % such that their total will be 100 weight %, wherein:

said Component A is one or more copolymers selected from a group consisting of graft copolymers and salts of copolymers, wherein the graft copolymers are obtained by a first process and a second process, and the salts of graft copolymers are obtained by said first process, said second process and a third process, said Component A having a structural unit shown by Formula 6;

said first process is for obtaining copolymers with weight-average molecular weight of 10000-50000 by radical polymerization of a mixture of radical polymerizable monomers containing maleic anhydrides and monomers shown by Formula 1 by a total of 95 molar % or more at molar ratio of 50/50-70/30 in the absence of solvent;

said second process is for obtaining graft copolymers by graft reaction of 100 weight parts of said copolymers obtained in said first process with 0.2-4 weight parts of polyether compounds shown by Formula 2;

said third process is for obtaining salts of graft copolymers by partially or completely neutralizing said graft copolymers obtained in said second process with alkali metal hydroxide;

said Component B is polypropyleneglycol monoalkyl ether shown by Formula 3;

said Component C is organic phosphate shown by Formula 4 or Formula 5;

Formula 1 is given by $CH_2=CH-CH_2-O-A^1-O-R^1$;

Formula 2 is given by $R^2-O-A^2-OH$;

Formula 3 is given by $R^3-O-A^3-OH$;
Formula 4 is given by

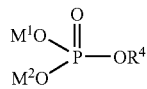

Formula 5 is given by

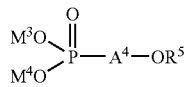

Formula 6 is given by

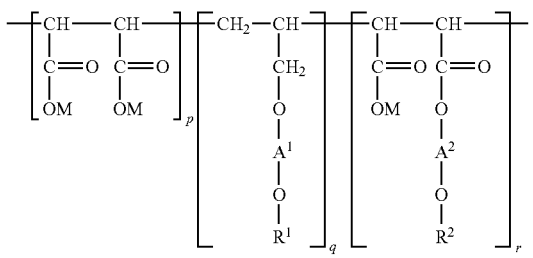

where:
- $R^1$ is methyl group or acetyl group;
- $R^2$ is aliphatic hydrocarbon group with 10-20 carbon atoms;
- $A^1$ is residual group obtained by removing all hydroxyl groups from polyethyleneglycol with polyoxyethylene group having 10-90 oxyethylene units in molecule;
- $A^2$ is residual group obtained by removing all hydroxyl groups from polyalkyleneglycol with polyoxyalkylene group having in molecule a total of 25-60 oxyethylene units and oxypropylene units;
- $R^3$ is alkyl group with 3-5 carbon atoms;
- $A^3$ is residual group obtained by removing all hydroxyl groups from (poly)propyleneglycol with (poly)oxypropylene group having in molecule only 2-4 oxypropylene units;
- $R^4$ and $R^5$ are each alkyl group with 8-18 carbon atoms;
- $A^4$ is (poly)oxypropylene group with 1-5 oxypropylene units;
- M is hydrogen atom or alkali metal;
- $M^1$, $M^2$, $M^3$ and $M^4$ are each hydrogen atom, alkali metal, alkali earth metal, ammonium or organic amine; and
- p, q and r are each an integer equal to or greater than 1.

2. The multi-functional admixture of claim 1 wherein said Component C is organic phosphate shown by Formula 5 where $R^5$ is alkyl group with 10-16 carbon atoms and $M^3$ and $M^4$ are each alkali metal.

* * * * *